Feb. 16, 1960   N. T. SAWDEY   2,925,166
TRANSFER APPARATUS AND COMBINATION THEREOF WITH MACHINES
Filed April 25, 1958   3 Sheets-Sheet 1
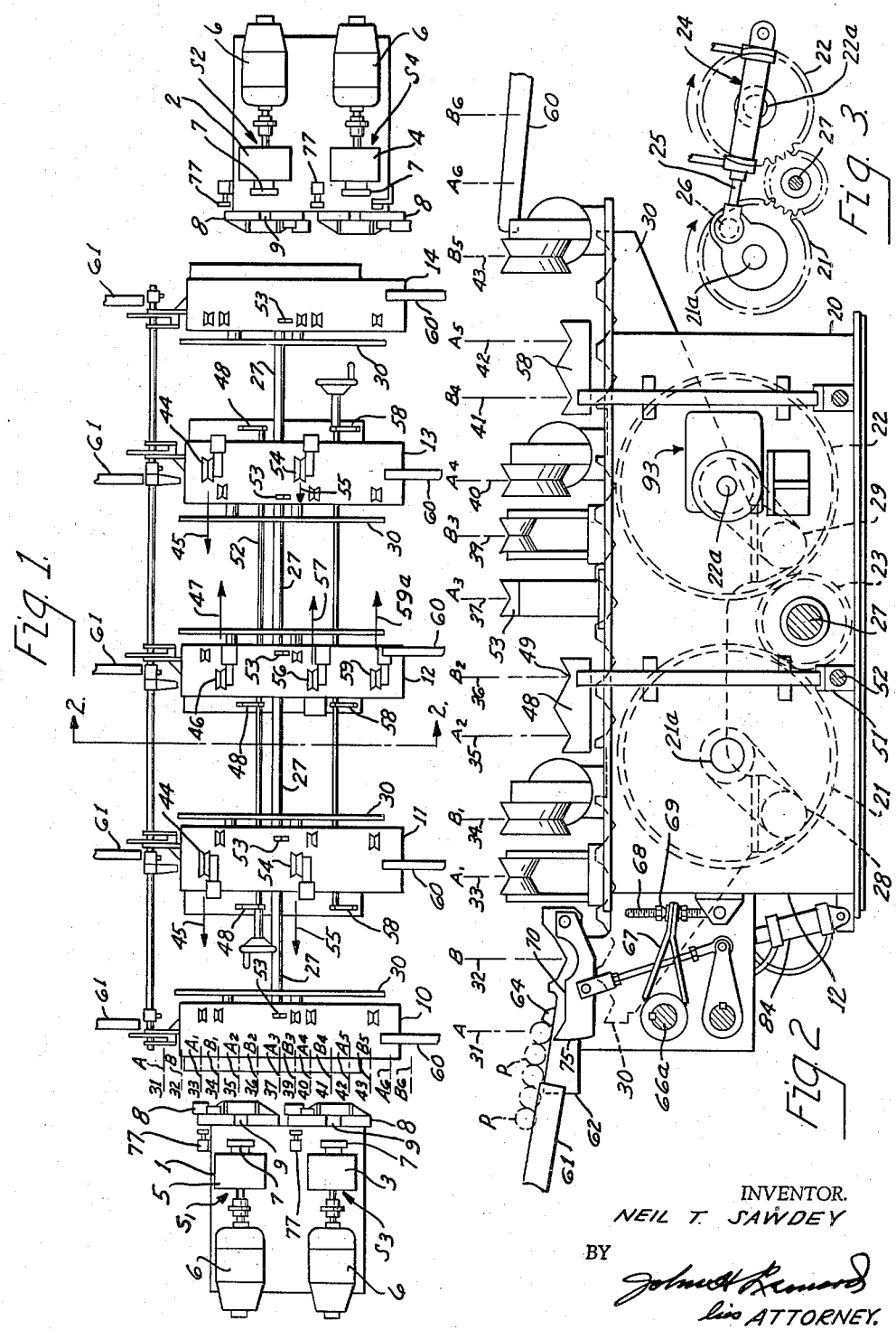
INVENTOR.
NEIL T. SAWDEY
BY
ATTORNEY.

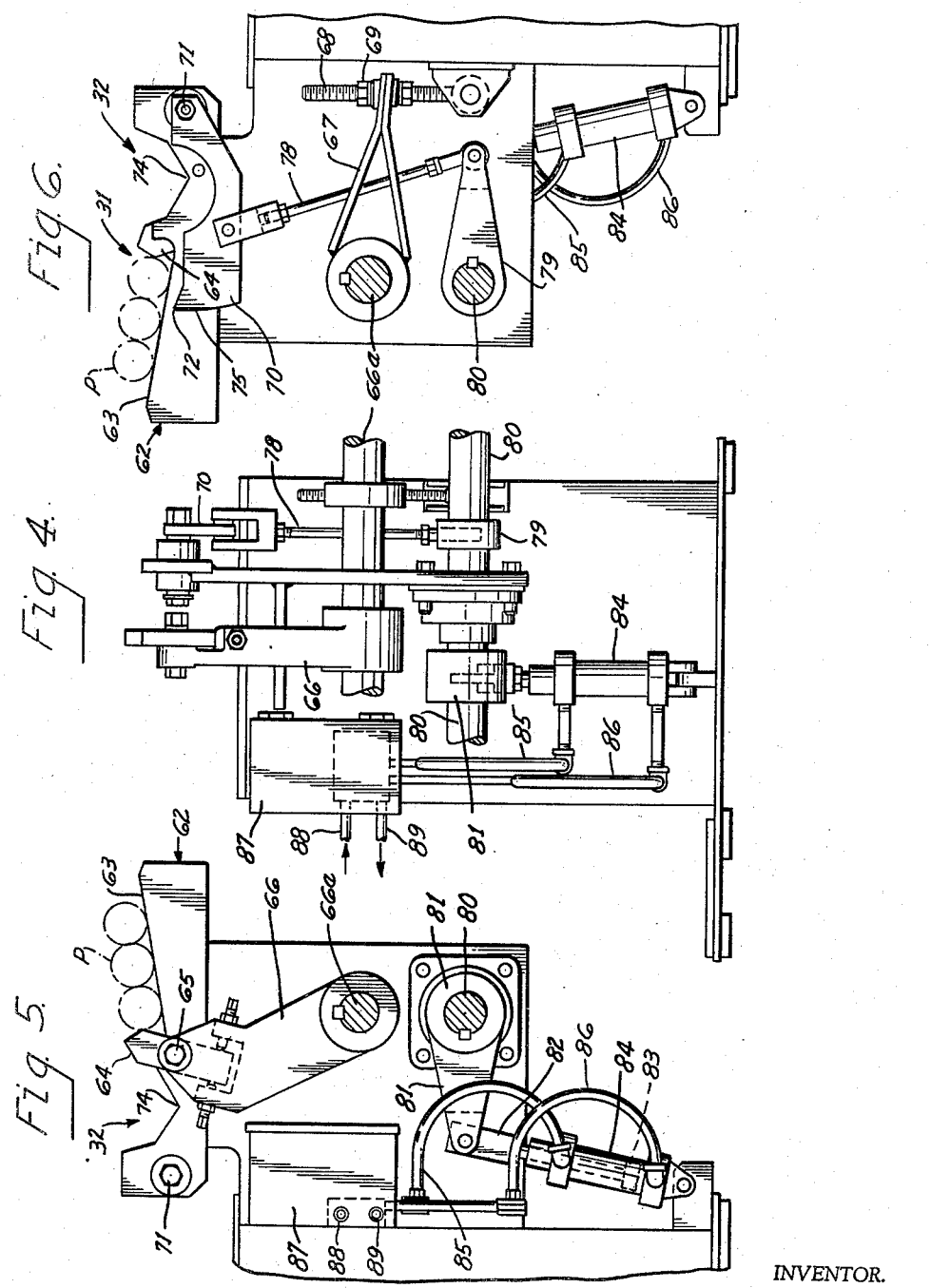

Feb. 16, 1960 N. T. SAWDEY 2,925,166
TRANSFER APPARATUS AND COMBINATION THEREOF WITH MACHINES
Filed April 25, 1958 3 Sheets-Sheet 3
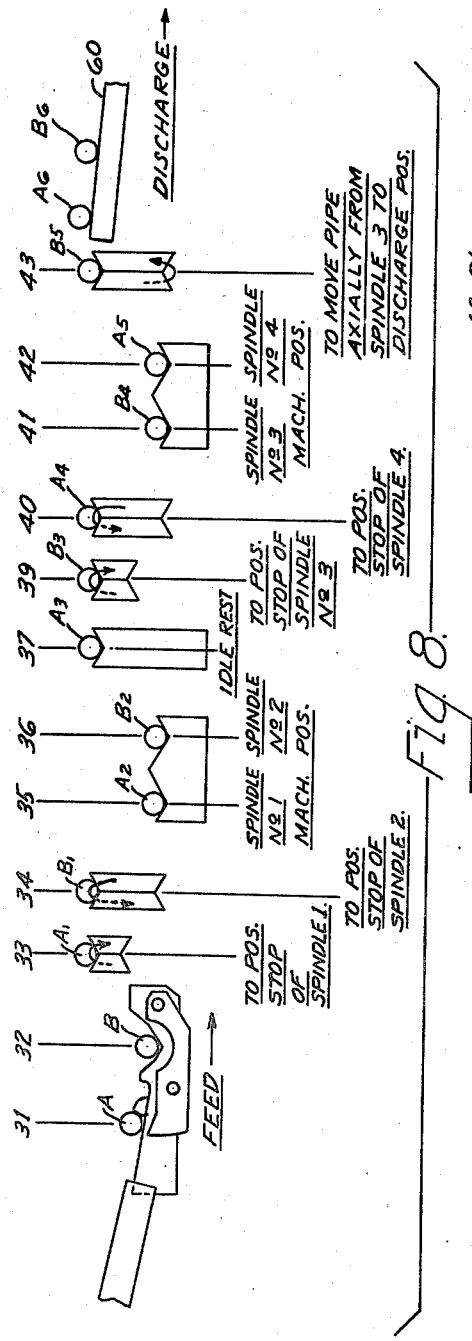
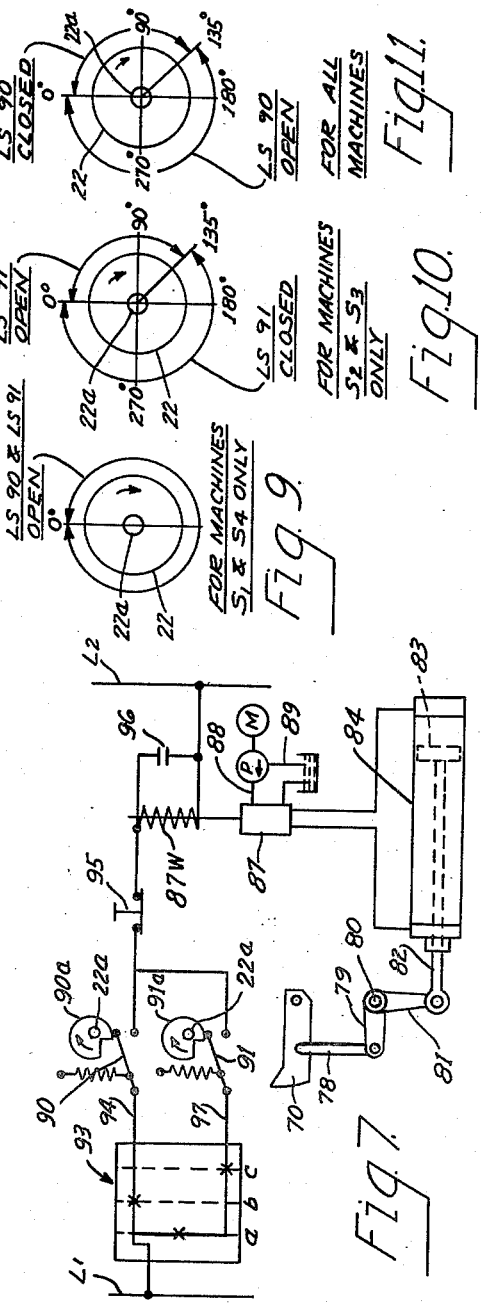
Inventor
NEIL T. SAWDEY.

United States Patent Office 2,925,166
Patented Feb. 16, 1960

2,925,166
TRANSFER APPARATUS AND COMBINATION THEREOF WITH MACHINES

Neil T. Sawdey, Euclid, Ohio, assignor to The Pipe Machinery Company, Wickliffe, Ohio, a corporation of Ohio Application April 25, 1958, Serial No. 730,936

6 Claims. (Cl. 198—19)

This invention relates to a transfer apparatus for transferring pipes, rods, bars, and the like, transversely of their lengths to different operational stations, and particularly to a transfer apparatus adapted for cooperation with a plurality of spindle machines, such as pipe cutting and threading machines, which are arranged at opposite ends of the transfer apparatus with their spindle axes parallel to each other and to the axes of the stock.

The present invention is an improvement on the inventions disclosed in my copending application, Serial No. 685,650, filed September 23, 1957.

For convenience in illustration, the present invention is described herein as applied to the transfer of pipes to different operational stations for facing by rotary spindle facing machines, its use in connection with other types of stock, machines, and apparatus being readily apparent from the illustrative example.

U.S. Letters Patent No. 2,728,327, issued on December 25, 1955, to W. L. Benninghoff and John Thomson, discloses a transfer apparatus of this general character for use with two spindle machines which are arranged one at each end of the apparatus introducing one additional pipe at each cycle of its operation, and transferring those pipes already in process concurrently to their respective successive stations.

In my copending application, there is disclosed an arrangement by which two additional pipes can be introduced at each cycle of operation of the transfer apparatus, concurrently, and those previously introduced can be transferred, concurrently, to their respective successive stations.

The present invention comprises an improvement on the structure of my copending application by virtue of which pipes not only can be fed concurrently to four machines, arranged two, side by side, at each end of the transfer apparatus, but also can be fed in regular cycles to either one of two selected pairs of the four machines, each of which pairs includes one machine at each end of the apparatus.

As an illustrative example, let it be assumed that there are four spindle machines, designated $S_1$, $S_2$, $S_3$ and $S_4$, respectively, arranged, in the direction of transfer from feed to discharge in the succession $S_1$, $S_2$, $S_3$ and $S_4$, and arranged end-wise of the apparatus with $S_1$ and $S_3$ at one end and $S_2$ and $S_4$ at the other end.

With this arrangement, as in my copending application, the present apparatus makes possible the introduction of two blank pipes, the discharge of two machined pipes and the feed of all pipes in intermediate stages of processing, concurrently, during each cycle of operation. A readily made setting makes possible also the introduction of one blank pipe, the discharge of one threaded pipe, and the feed of all pipes in intermediate stages of processing, concurrently, during each cycle of operation, with respect to either the spindles $S_1$ and $S_4$ or the spindles $S_2$ and $S_3$.

More specifically, the improvement resides in the combined feed and separating mechanism for separating the pipes as they are fed from a loading skid to the apparatus, and the control and timing arrangement thereof which can be set readily to provide the desired feed and transfer at each cycle.

Other improvements and various advantages of the invention will become apparent from the following description, wherein reference is made to the drawings, in which:

Fig. 1 is a diagrammatic top plan view of a preferred form of transfer apparatus embodying the present invention, in combination with four concurrently operative rotary spindle machines;

Fig. 2 is an enlarged vertical cross sectional view of the transfer apparatus, and is taken on the lines 2—2 of Fig. 1, part thereof being shown in section for clearness in illustration;

Fig. 3 is an enlarged fragmentary view of the driving mechanism shown in Fig. 2, and is shown as a detached view for clearness in illustration;

Figs. 4, 5, and 6, are, respectively, enlarged fragmentary rear, left end, and right end, elevations of the combined feed and separating mechanism shown in Figs. 1 and 2;

Fig. 7 is a wiring and hydraulic circuit diagram illustrating the control system for the present apparatus;

Fig. 8 is a diagrammatic view of the apparatus illustrated in Fig. 3 with legends thereon for use in explaining the different cycles of operation of the present apparatus;

Figs. 9, 10, and 11 are diagrammatic illustrations of different operating positions of the control switches for cycles involving preselected groupings of the machines with which the present invention is associated.

Referring to the drawings, the transfer apparatus and the apparatus and machine combination, as more fully described in my above identified copending application, are shown as comprising a plurality of motor driven rotary spindle machines $S_1$ through $S_4$, respectively, the machines $S_1$ and $S_3$ being arranged at one end of the transfer apparatus, and the machines $S_2$ and $S_4$ at the opposite end. The machines have spindles 1 through 4, respectively. Since each machine is the same in structure, only one is referred to herein in detail.

Referring to the machine $S_1$, as exemplary, it comprises the usual transmission mechanism 5 driven by a motor 6, a retractible rotary cutter 7 carried by its spindle 1, a suitable holding chuck 8 into the throat 9 of which the pipe to be machined can be lowered transversely of its axis into machining position wherein the adjacent end of the pipe is near enough the face of the cutter 7 so that the cutter can be advanced the necessary distance for the machining operation.

The machines for operation of laterally adjacent pipes are arranged at opposite ends of the apparatus so those at one end cooperate with pipes which are arranged alternately transversely of the apparatus. Thus the axes of the spindles 1 and 3 at one end of the apparatus are alternated in the direction of transfer with the axes of the spindles 2 and 4 at the other end.

The transfer apparatus comprises a plurality of stands, indicated as 10 through 14, respectively. The stands 11 and 13 are power stands, whereas the stands 10, 12 and 14 are dummy stands which are the same as the power stands except that the primary power means for operating the apparatus are not included therein, but instead are included only in the stands 11 and 13. Since the stands, with this difference, are essentially the same, only one, the dummy stand 12 and the power mechanism of stands 11 and 13, shown in Fig. 3, are described herein in detail.

The stand 12 comprises a suitable base or frame 20, in which a pair of gears 21 and 22 are mounted on shafts 21a and 22a, respectively. The gears are interconnected by means of a gear 23 interposed therebetween. The gear 21 is driven by means of a piston and cylinder assemblage 24 of the power stands. Each assemblage 24 has a piston with a rod 25, which is drivingly connected to an eccentric crank 26 on the gear 21.

As described in the above identified patent, each power stand is provided with a similar drive, and the drive of one power stand is 90 degrees out of phase with the drive of the other power stand so that the apparatus cannot come to rest in a dead center position. Each assemblage 24 is operable to rotate its associated gear 21 through one complete revolution and then stop. The gear 23 is mounted on a shaft 27 which is common to the gears 23 of all of the stands so that the corresponding gears 21 and 22 of each dummy stand will be driven in fixed timed relation to each other and to those of the power stands through the torque imparted to the gears 23 of the power stands by the driven gears 21 of the power stands.

Supported on eccentric cranks 28 and 29 on the gears 21 and 22, respectively, is a transfer lift rack 30. The axes of the cranks 28 and 29 preferably are the same distance out from the axes of the gears 21 and 22, and, in starting position, lie in a common horizontal plane. The gears 21 and 22 are of the same diameter. As a result, upon rotation of the gears 21 and 22 through one complete revolution, each point on the transfer rack describes a circular path with an axis parallel to the axes of the gears 21 and 22. The lift rack 30 travels in its circular path parallel to its starting position. The rack 30 may be made to travel in other types of closed paths, if desired, but the circular path is preferred.

In the form illustrated, the gears 21 and 22 rotate in the direction indicated by the arrows in Fig. 3, which is in a clockwise direction, and the transfer rack 30 has been lifted through an arcuate path from starting position and is just entering the upper left hand quadrant, upwardly and to the right through the upper left hand quadrant, thence downwardly and to the right through the upper right hand quadrant, thence downwardly and toward the left through the lower right hand quadrant, and thence upwardly and to the left through the lower left hand quadrant to the place of beginning.

The rack 30 is substantially coextensive in dimension with the transfer apparatus in the direction of transfer and is arranged to receive the pipes at the feed side of the apparatus, and then, successively, to lift them upwardly and to the right and lower them downwardly and to the right into different operational stations, and, upon continued operation, to pass below the level of all of the pipes to allow them to come to rest in their holding and processing stations. This action is repeated each time the rack 30 makes one complete circuit through its closed circular path. Stations of the transfer apparatus are provided at each stand. Those of each stand are arranged in a row, in the direction of transfer, across the apparatus. The stations of each stand are aligned with corresponding stations of the other stands endwise of the apparatus.

In the form shown, the stations comprise, in sequence from the feeding side to the discharge side of the apparatus, two pickup stations 31 and 32, two positioning stations 33 and 34, two operational stations 35 and 36, a single idle rest station 37, two positioning stations 39 and 40, two operational stations 41 and 42, and a single aligning station 43.

The pickup stations are arranged so that each supports a single length of pipe in a position for picking up by the transfer rack 30, the pipes being supported for this purpose in spaced relation to each other transversely of the apparatus. The positioning stations 33 and 34 are arranged to position the pipes endwise of the apparatus, the station 33 being arranged to position a pipe for operation by the spindle 1 and the station 34 being arranged to position a pipe for operation by the spindle 2. Accordingly, the station 33 includes a plurality of power operated driving rolls 44 which are rotated, as indicated by the arrow 45, so as to drive the stock toward the spindle 1. The station 34 includes a power operated driving roll 46 which is rotated so as to drive the pipe thereon, as indicated by the arrow 47, toward the spindle 2. Suitable idler rolls are distributed along the stations as desired.

Stations 35 and 36, which are operating stations, comprise essentially a plurality of pipe rests 48, each of which, in the form illustrated, comprises a single piece of metal having notches 49 therein to accommodate the pipes in laterally spaced relation to each other. Each rest is supported on an upright post 50 which is adjustable vertically by means of a pair of complementary wedges 51, one complementary wedge being carried on the post and one on a longitudinally movable shaft or draw rod 52, so that all of the rests in a single row endwise of the apparatus can be adjusted simultaneously in height for different diameters.

The idle rest station 37 comprises stationary rests 53, inasmuch as the pipe does not change position endwise when in the idle rest station 37. The positioning station 39 includes a plurality of power driven rolls 54, which are rotated so as to drive the pipe in a direction toward the spindle 3, as indicated by the arrow 55. The positioning station 40 includes a power driven roll 56 which is rotated to drive the stock toward the spindle 4, as indicated by the arrow 57. The operating stations 41 and 42 are provided with rests 58 which essentially are the same as the rest 48 heretofore described and are adjustable in like manner.

To the extreme right of the structure, as illustrated in Fig. 2, is the aligning station 43 which includes a power driven roll 59 which is rotated to drive a length of pipe in the direction indicated by the arrow 59a, which is generally toward the end of the apparatus at which the spindle 4 is located, as at this end there is also located a discharge skid 60.

In order to feed the pipe to the transfer apparatus for transfer transversely of the apparatus to the different stations, a suitable loading skid 61 is provided. The skid 61 is inclined so that the pipes, as indicated generally at P, roll down the incline toward the adjacent side of the transfer apparatus.

As better illustrated in Fig. 4, a combined feed and pipe separator is provided along the left, or feeding side, of the apparatus, one unit at each of the various stands. Each unit includes a receiving rest 62 which has an upwardly exposed surface 63 inclined downwardly away from the skid and adapted to receive the pipes from the skid and permit them to roll transversely of their length downwardly and laterally inwardly of the apparatus toward the pickup position. Each of the rests 63 is provided with a cooperating stop arm 64 which is adjustable to different positions transversely of the apparatus for purposes which are described hereinafter.

Each arm 64 is mounted for rocking movement transversely of the apparatus by a pivot 65, and is adjustable to different positions by means of an adjustable rocker arm 66, which is rockable with a shaft 66a on which a yoke arm 67 is secured. The rocker arm 66 is adjustably connected at one end with the lower end of the arm 64. The yoke arm 67 can be adjusted along the rod by means of suitable nuts 69.

A feed and separator arm 70 is mounted by a pivot 71 on each support 62, for swinging movement about a horizontal axis of the pivot 71. The pivot 71 is inwardly of the support from the arm 64. The free end of the separator arm 70 is provided with a finger 72 which is positioned so that when a pipe is resting on the surface 63 and against the stop arm 64 in the particular adjusted position of the arm 64, the finger 72 is in the proper position to pass between the outboard side of the pipe which is resting on the surface 63 and against the stop arm 64 and the inboard side of an outwardly adjacent pipe which is resting on the surface 63 and is juxtaposed against the pipe which is resting against the arm 64.

The separator arm 70 has an upwardly exposed supporting surface 73 which extends from the finger 72 rearwardly toward the pivot 71. Near its inboard end, the support 62 is provided with a notch 74 which is adapted to receive and accommodate a pipe when a pipe is rolled thereinto transversely of the apparatus. The surface 73 of the separator arm 70 extends from the finger 72 sufficiently far rearwardly, and is so arranged, that, when the separator arm 70 is swung upwardly to a predetermined distance above the location in which the finger 72 entered between two pipes, it lifts the pipe from in front of the arm 64 to an elevation such that the surface 73 slopes downwardly from the pipe toward the pivot 71. Thereupon the pipe which was formerly resting against the outboard face of the arm 64, rolls down the surface 73 into the notch 74. During this operation, the outer end surface 75 of the separate arm 70 prevents any pipes which were outwardly from the lifted pipe from rolling down against the arm 64 until the separator arm 70 has been lowered to starting position, whereupon another pipe rolls down the surface 63 into position against the arm 64.

Let it be assumed, as a starting condition, that a pipe A is at station 31 resting against the arm 64, that another pipe B is in the notch 74 of the support 62, which is station 32, and that a plurality of pipes P are resting on the loading skid and are urged by gravity downwardly toward the stop arm 64, and that each of stations 33 through 43 supports a pipe. Upon operation of the rack, the pipe A in pickup station 31 and the pipe B in pickup station 32, are lifted in an arcuate path upwardly and to the right and then lowered downwardly and to the right until the pipe A is deposited on the rolls 44 and pipe B on the rolls 46 of the positioning stations 33 and 34, respectively. Immediately, the pipe A is moved toward the spindle 1, and the pipe B is moved toward the spindle 2, until they strike the stops 77 of the spindles 1 and 2, respectively. These stops are arranged in all instances so that when the end of a pipe is abutting the stop, the pipe is in proper position for machining. The rolls may be controlled or timed with relation to the driving of the rack 30 so that they are stopped prior to the movement of the rack to lift the pipes A and B from the rolls 44 and 46. Thus, at the end of the first complete cycle of the rack 30, the pipes A and B are in their first positioning stations 33 and 34, respectively, their portions being indicated by the designations $A_1$ and $B_1$, and have been moved endwise to proper position against the stops 77.

In the next cycle of the rack, the pipes $A_1$ and $B_1$, without any change in their positions endwise from their endwise positions in the stations 33 and 34, are transported in arcuate paths upwardly from the stations 33 and 34 and then downwardly and to the right, and deposited in the notches 49 of the rest 48 of the operating stations 35 and 36. Accordingly, the pipes are now in positions $A_2$ and $B_2$ wherein they are in the throats 9 of the chucks 8. Therefore, the pipe in position $A_2$ is in position for operation by the spindle 1 and the pipe in position $B_2$ is in position for operation by the spindle 2. Thereupon, the pipes are clamped by the chucks 9 and the machining operation is effected by the spindle 1 on one end of the pipe in position $A_2$ and by the spindle 2 on the opposite end of the pipe in position $B_2$.

When these machining operations are completed, the rack is again operated through a complete cycle and lifts the pipes from the positions $A_2$ and $B_2$ in the operating stations 35 and 36 upwardly and to the right and thence downwardly. On the downward movement of the rack, the pipe $A_2$ is deposited in position $A_3$ on the stationary rest 53 of the idle rest station 37, and the pipe $B_2$ is moved to the position $B_3$ on the power driven rolls 54 of the positioning station 39, which rolls immediately move the pipe in position $B_3$ toward the spindle 3 until it strikes the stop 77 thereof. Meanwhile, the pipe in position $A_3$ has not changed its position endwise.

After the pipe in position $B_3$ has been moved to the stop of the spindle 3, the rack is again operated through a complete cycle whereupon the pipe in position $A_3$ is lifted from the idle rest station 37 and moved to position $A_4$ in the positioning station 40 where it is deposited on the rolls 56 and driven thereby toward, and against the stop 77 of, the spindle 4. Concurrently, the pipe in position $B_3$ is carried from its positioning station 39, at which it was already positioned endwise against the stop 77 of the spindle 3, to the position $B_4$ in the operating station 41 with the pipe in the proper endwise position for operation by spindle 3.

After machining by the spindle 3 is completed, the rack operates through another complete cycle whereupon the pipe which had been in position $B_4$ in the operating station 41 is lifted upwardly and to the right and then lowered and deposited in position $B_5$ on the driven rolls 59 of the aligning station 43. The rolls 59 are driven so as to drive the pipe endwise in a direction toward the spindle 4 which is adjacent to the discharge skid 60 so that the pipe will be in position for discharge onto the skid 60. At the same time, the pipe in the position $A_4$ in the station 40 is moved into position $A_5$ in the operating station 42 in which it is machined by the spindle 4, having already been moved to the proper end of the apparatus.

Upon the next complete cycle of the rack 30, the pipes A and B are lifted upwardly and to the right and deposited on the skid 60 in positions $A_6$ and $B_6$, respectively, and thus discharged.

It is apparent that the pipe at the position $A_2$ is machined at one end by spindle 1, and the pipe at position $B_2$ is machined at the opposite end by spindle 2, and the pipe in position $B_4$ which has been machined at one end by spindle 2 is moved up and machined at its opposite end by spindle 3, and the pipe in position $A_5$ which has been machined at one end by spindle 1 is moved down and machined at the opposite end by spindle 4.

It is also apparent that, by this arrangement, a larger number of pipes can be handled effectively with the spindles operating at full capacity, and with a minimum of floor space.

The timing and driving of the apparatus, spindles, and the like, may be in accordance with the teachings of Patent No. 2,728,327, above cited, the lengths of dwell of the pipes in any station depending upon the particular requirements of the threading or cutting operations, and the timing of the driven rolls depending upon the lengths of the pipe and the time required for the machining operation, due to the various lengths of the machined portions, and the like.

The aligning station is very desirable in those instances in which there is a considerable variation in the lengths of pipes. However, if a large number of pipes which are to be operated on are of substantially the same length as each other, and are loaded on the rack with their corresponding ends substantially coplanar with each other, then the aligning stations are unnecessary.

In order to actuate the combined feed and separating device in accordance with the present invention, each separator arm 70 is connected by a link 78 to a crank arm 79 which is rockable with a common rock shaft 80. A driving crank arm 81 is connected to the shaft 80 for rocking therewith and, in turn, is connected to the rod 82 of a piston 83 which is reciprocable in a cylinder 84. Pressure fluid is supplied to opposite ends of the cylinders 84, selectively, by lines 85 and 86 by way of a solenoid operated reversing valve 87 to which pressure fluid is supplied by a feed line 88 and from which it is vented to a sump by a discharge line 89.

Energization of the solenoid causes the piston and cylinder to raise the separator arm 70 and to hold it in raised position. Deenergization causes the assemblage to lower the arm 70.

Referring to Fig. 7, the solenoid switch 87 is arranged to be operated in accordance with preselected circuits controlled by limit switches 90 and 91, respectively, which are normally open. The switches 90 and 91 are arranged to be closed by suitable cams 90a and 91a, respectively, which are driven by the shaft 22a of one of the gears 22 so that each cam makes one complete revolution for each revolution of the gear 22 or rack 30.

The control circuit includes a master switch 93 having one terminal connected to the line $L_1$ and arranged, in one position, to connect, by way of a line 94, in series across the source $L_1$, $L_2$, in order, beginning with the master switch, the normally open limit switch 90, the normally closed push button switch 95, and the winding 87w. A condenser 96 is connected in parallel with the winding 87w.

The master switch 93 also is arranged so that in another position, by way of a line 97, it connects the limit switch 91 between the line $L_1$ and a point between the switch 90 and winding 87w, and preferably between the switches 90 and 95, and thus in by-passing relation to switch 90.

In still another position, the limit switch opens both lines 94 and 97, rendering the entire control circuit inoperative.

Thus, as indicated in Fig. 7, the master switch 93, in position "a," opens both lines 94 and 97, rendering the control circuit inoperative, in position "b," establishes the circuit through one limit switch 90, and in position "c," establishes a circuit through the other limit switch 91.

First, assuming pipes are to be fed only to machines $S_1$ and $S_4$, the master switch 93 is set at setting "a," and both limit switches are inoperative. Hence, the arm 70 is inoperative. The only station in which a pipe can be picked up is station A. Accordingly, for each cycle of the rack 30, a single pipe is fed, and for the successive cycles is transferred, in sequence, beginning with station 31, stations 33, 35, 37, 40 and 42 and thence to the discharge rack or skid 60. The operations performed are as follows:

At station 33, the pipe is moved endwise against positioning stop for spindle 1. At station 35, the pipe is at rest in the chuck for machining by the spindle 1. At station 37, the pipe is at rest in an idle position. At station 40, it is moved endwise to the positioning stop for the spindle 4. At station 42, it is at rest in the chuck for machining by the spindle 4. Next, it passes to the discharge rack or skid 60.

When a pipe is removed by the lift rack 30 from station 31, another immediately rolls into place, ready to feed at the next cycle of revolution of the rack 30 following the cycle which removed its predecessor from station 31.

Next, assuming pipes are to be fed only to machines $S_2$ and $S_3$ and a pipe is at station 31, the operation is as indicated in Fig. 10.

In this position of the master switch 93, as designated at "c" in Fig. 7, the limit switch 90 is out of the circuit and limit switch 91 controls. At 0°, or top dead center of the lift rack 30, the switch 91 opens, the winding 87w is deenergized, and the arm 70 is in lowered position. When the rack 30 moves clockwise to 135°, the transmission 92 operates the cam 91a to close the switch 91. Thereupon the solenoid valve 87 is energized and operates to cause the piston 83 to lift the arm 70 and thereby transfer the pipe in station 31 to station 32. The switch 91 remains closed, and hence the arm 70 remains raised, as the rack 30 moves from 135° on around and up to 0° or upper dead center position. Hence, no pipe can roll to station 31 and the pipe at station 32 is picked up by the rack 30.

As the rack 30 passes through its second cycle, switch 91 is opened, deenergizing the solenoid 87, lowering the arm 70 and allowing another pipe to roll to station 31, which, during the same cycle, is transferred to station 32 and picked up from station 32 while station 31 remains empty. The pipe removed from 32 passes, successively, to stations 34, 36, 39, 41 and 43.

The following operations are performed:

At station 34, the pipe is moved endwise to the positioning stop for spindle 2; at station 36, the pipe is at rest in the chuck for machining by spindle 2; at station 39, the pipe is moved endwise against the positioning stop for spindle 3. At station 41, the pipe is at rest in the chuck for machining by the spindle 3. At station 43, it is fed endwise to position for discharge to the rack or skid 60, and from station 43 the pipe is transferred to the discharge rack or skid 60.

If pipes are to be fed simultaneously to all spindles 1, 2, 3, and 4, then the master switch 91 is set in position "b," in which the normally open limit switch 90 is effective and 91 is out of the circuit. The cycle of operation of the switch 90 is illustrated in Fig. 11.

Starting at top dead center, with the rack 30 rotating clockwise, the switch 90 is closed by the transmission 92 and remains closed until the rack has moved to position 135°. During this period, the solenoid valve 87 is energized and has caused the piston 83 to raise the arm 70 and transfer a pipe from station 31 to station 32.

When the lift rack 30 rises, it lifts pipes from stations 31 and 32, concurrently. On its next cycle, the feed is repeated, and also, pipes fed into stations 31 and 32 on the previous cycle, are transferred to stations 33 and 34, respectively.

The successive cycles transfer the pipes as follows: Beginning with station 33, the pipe A passes successively to stations 35, 37, 40, 42, and to the discharge skid 60. Pipe B, beginning with station 34, passes, successively, to stations 36, 39, 41 and 43, and thence to the discharge skid or rack, as hereinbefore described.

It is apparent from the foregoing that the transfer apparatus and four machines can be used for machining four pipes concurrently, using all of the machines, or two pipes concurrently using one machine at each end of the transfer rack, or two pipes concurrently using the other of the machines at each end.

Thus, if any machine requires servicing, or the run of pipes is inadequate for setting up all four machines, either of two sets of two machines can be used, as in the apparatus in the foregoing identified patent.

Having thus described my invention, I claim:

1. In a transfer apparatus including a plurality of stationary stands arranged in alignment in a row extending endwise of the apparatus, a transfer rack for the stands, stock stations on the stands and spaced from each other laterally of the row of stands and including, in sequence from one side of the apparatus to the other, first and second pickup stations, and subsequent stations, means for driving the rack unidirectionally in a generally upright closed path transversely of the row, in cycles of one revolution each, said path being one wherein the rack rises at the side of its path nearer the pickup stations and travels upwardly transversely and then downwardly transversely as it moves from said side toward the last station, means on the rack to engage the underside of pipes in said stations, respectively, and to lift the pipes clear of their respective stations as the rack rises and, as the rack continues along said path, to transfer each length of stock at each cycle, to the second station beyond the one in which it is disposed at the beginning of the cycle, a loading skid down which the lengths of stock are urged, transversely of their axes, toward the first pickup station, a feed device operable when in a first position to permit a length of stock to enter the first pickup station, and when moved to a second position to shift the length of stock from the first pickup station to the second pickup station and to block the entry of a subsequent length of stock to the first station, power means operable to move the feed device to said positions, respectively, and to hold it in said blocking position, control means for the power means and operable in predetermined timed relations to the cycles of the transfer rack for controlling operation of said power means, to render the power means operative to move the device from said first position to the second position, to render the power means operative to hold the device in said second position, and to render the power means operative to return the device to starting position, respectively, manually settable selective means operative in one set condition for rendering the control means inoperative during each cycle, in a second set condition for rendering the control means operative for causing the feed device, during each cycle, to move from starting position to said second position and remain in said blocking position while the stock transferred to the second pickup station at the beginning of the cycle remains in said second pickup station, and then to return to starting position after the rack has picked up the stock from the second pickup station, and, in a third condition, for causing the device during each cycle, to move from starting position to said second position and return to starting position between the passage of the rack beyond lifting position and its return to lifting position.

2. A transfer apparatus according to claim 1 wherein the control means includes an electrically operated device for controlling the operation of the power means, said settable means is a master switch which is settable in its said conditions, control circuits, including switches, for connecting the device across a source of power, and rendered operative, selectively, by the master switch, means driven in timed relation to the cyclic movement of the rack for operating the switches of the selected circuits to cause, in the associated set conditions of the settable means, the associated movements of the feed device.

3. A transfer apparatus according to claim 2 wherein the switches are limit switches and are operated by cams which are driven in fixed relation to the cyclic movement of the rack.

4. A transfer apparatus according to claim 3 wherein there are two limit switches, and one is in the circuit established by one condition of the settable means and the other is in the circuit established by another condition of the settable means.

5. A transfer apparatus according to claim 4 wherein, in the third condition of the settable means, all circuits are inoperative with respect to the electrically operative device.

6. A transfer apparatus according to claim 2 wherein the control circuits include a first circuit adapted to connect the electrically operated device across a source through a first normally open limit switch, a second circuit adapted to connect the electrically operated device across a source through a second normally open limit switch, cams respective to the switches are arranged to be driven in timed relation to the cycles of the rack, and are operative to close the switches, respectively, when the cams are in operating positions, the first circuit being rendered operative by the settable means when the settable means is in said one condition, and the second circuit being rendered operative by the settable means when the settable means is in said third condition.

References Cited in the file of this patent
UNITED STATES PATENTS

| | | |
|---|---|---|
| 2,654,463 | Church | Oct. 6, 1953 |
| 2,728,327 | Benninghoff et al. | Dec. 27, 1955 |